United States Patent [19]

Moore et al.

[11] Patent Number: 4,513,277
[45] Date of Patent: Apr. 23, 1985

[54] LOW FUEL INDICATOR SYSTEM

[75] Inventors: John T. Moore, Nr. Wigan; Peter E. Corrigan, Liverpool; James A. Gardner, Nr. Liverpool, all of England

[73] Assignee: General Motors Corporation, Detroit, Mich.

[21] Appl. No.: 472,712

[22] Filed: Mar. 7, 1983

[30] Foreign Application Priority Data

Mar. 9, 1982 [GB] United Kingdom ............... 8206860

[51] Int. Cl.³ .............................................. G08B 21/00
[52] U.S. Cl. .................................. 340/59; 340/52 D; 340/527; 340/530
[58] Field of Search ............... 340/527, 52 D, 59, 618, 340/619, 661, 632, 613, 52 R, 529, 530

[56] References Cited

U.S. PATENT DOCUMENTS 3,886,518  5/1975  Bozoian .................................. 340/59
3,938,117  2/1976  Bozoian .............................. 340/527

Primary Examiner—James L. Rowland
Assistant Examiner—Chi K. Lau
Attorney, Agent, or Firm—Warren D. Hill

[57] ABSTRACT

A low fuel indicator system 10 for a motor vehicle comprises a light-emitting indicator 12 which is energized or de-energized by an output signal derived from a voltage comparator 14 which receives a reference voltage from a reference voltage source 20 and a variable voltage signal from a time delay circuit 22, which variable voltage signal is derived from a voltage signal generated by a fuel level sensor in a fuel tank of the vehicle. The light-emitting indicator 12 is energized when the fuel level in the fuel tank falls below a predetermined low level, and time delay circuit 22 operates to isolate the voltage comparator 14 and light-emitting indicator 12 from temporary variations in fuel level produced by "fuel-slosh" in the fuel tank caused by variations in the motion or orientation of the motor vehicle. In a preferred embodiment of the invention, a time delay override circuit 24 is included which is operable upon switching on the ignition circuit of the vehicle to energize the light-emitting indicator 12 if the level of fuel in the fuel tank is above said predetermined low level but below a second predetermined level corresponding approximately to the fuel tank being a quarter full.

4 Claims, 7 Drawing Figures

LOW FUEL INDICATOR SYSTEM

This invention relates to a low fuel indicator system for a motor vehicle for monitoring the operation of a fuel level sensor in a fuel tank in said motor vehicle, and, in particular, to a low fuel indicator system in which a visible indicator means is used to indicate that a predetermined low level of fuel has been reached in a fuel tank of a motor vehicle.

Motor vehicles customarily use a fuel level sensor in the fuel tank which monitors the change in level of the fuel contained within the tank and transmits an indication of the fuel level as an electrical signal, quite commonly a voltage signal, to an electrically operable fuel gauge situated on an instrument panel of the motor vehicle. It is customary to have such fuel gauges calibrated in terms of the quantity of fuel remaining in the fuel tank, and to mark distinctively one end of the scale reading to indicate that the fuel level has fallen to such a low level that re-fueling of the tank is required. Unfortunately, this warning portion of the scale of the fuel gauge tends to be small, and easily overlooked by a driver of the motor vehicle. Consequently, there is a need for said driver of the vehicle to be made aware of the low level of fuel in the tank by means of an easily visible indicator means, preferably one that is a light-emitting means. The operation of such a light-emitting means would then quickly and effectively call the attention of the driver to the fact that fuel level in the tank was becoming unacceptably low. It is desirable in such a system that the light-emitting indicator means should indicate accurately when a predetermined level of fuel has been reached in the tank, but it is necessary to avoid, in this respect, any tendency for such a light-emitting indicator means to become energized as a result of the fuel in the fuel tank varying rapidly in level due to motion of the motor vehicle and/or orientation of the motor vehicle relative to the road surface.

A low fuel indicator system according to the present invention, for monitoring the operation of a fuel level sensor in a fuel tank in a motor vehicle, comprises a light-emitting indicator means connected to a voltage comparator means having two inputs thereto, one of said inputs being derived from a reference voltage source and the other of said inputs being derived from a voltage signal produced from a time delay circuit when said time delay circuit is provided with a voltage signal from said fuel sensor, said voltage comparator means being operable, when the system is installed in said motor vehicle, to compare said two inputs so as to energize said light-emitting indicator means when said fuel sensor voltage signal corresponds to a predetermined low level of fuel in said tank and to de-energize said light-emitting indicator means when said fuel sensor voltage signal corresponds to levels of fuel above said predetermined level, said time delay circuit on said other of the inputs to the comparator being operable so as to substantially isolate the comparator from the effects of rapid fluctuations in fuel level in said tank caused by motion or orientation of the motor vehicle.

Preferably the low fuel indicator system includes a time delay override circuit which is operable, when the system is installed in said motor vehicle, to by-pass the time delay circuit for a short predetermined time period when the ignition system of said motor vehicle is initially switched on, and is then rendered non-operable at the end of said short predetermined time period. This time delay override circuit comprises a thyristor which bridges a portion of said time delay circuit and is fired into conduction by a differentiating network.

In one embodiment of the invention, the light-emitting indicator means is a light-emitting diode, the reference voltage source comprises a resistor network connectable between a regulated voltage source and a ground potential, and the time delay circuit comprises a capacitor connectable between said regulated voltage source and said other input to the comparator means, and a resistor connectable between said fuel level sensor and said other input to the comparator means. Such a low fuel indicator system according to this embodiment finds application in motor vehicles which utilize a regulated voltage source to operate other indicating instruments (such as a bi-metal fuel gauge) on an instrument panel in the motor vehicle. Advantageously, a low fuel indicator system according to this embodiment of the invention is housed in the instrument panel adjacent a fuel gauge connectable to said fuel level sensor.

A second embodiment of the present invention is a low fuel indicator system in which the light-emitting indicator means is an incandescent lamp connected to the output of the voltage comparator means through a transistor switching circuit, the reference voltage source comprising a resistor network connected between a voltage-regulating circuit and a ground potential, and the time delay circuit comprises a capacitor connected between said voltage-regulating circuit and said other input to the comparator means, and a resistor connectable between said fuel level sensor and said other input to the comparator means. A low fuel indicator system according to the second embodiment of the invention is useful in motor vehicles not employing a regulated voltage source for instruments, such as those motor vehicles fitted with an air-core fuel gauge, since the system of the second embodiment of the invention is designed to operate from direct battery potential. Advantageously a low fuel indicator system according to the second embodiment of the invention forms part of an in-line connector designed to snap into position in an instrument panel wiring harness of a motor vehicle.

The invention and how it may be performed are hereinafter particularly described with reference to the accompanying drawings, in which.

Figure 1:
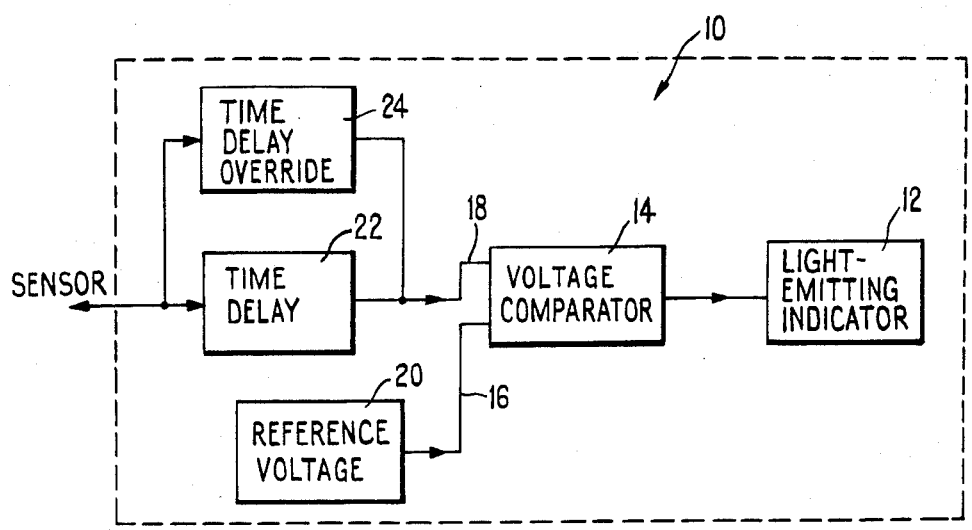
FIG. 1 shows a schematic diagram of a low fuel indicator system according to the present invention.

FIG. 1 shows a low fuel indicator system 10 according to the present invention which comprises a light-emitting indicator 12 connected to a voltage comparator means 14 having two inputs 16, 18 thereto, one of said inputs, 16, being derived from a reference voltage source 20 and the other of said inputs, 18, being derived from a voltage signal produced from a time delay circuit 22 when said time delay circuit is provided with a voltage signal from a fuel level sensor (not shown). The voltage comparator means 14 is operable, when the system 10 is installed in a motor vehicle, to compare said two inputs 16, 18 so as to energize said light-emitting indicator 12 when said fuel level sensor voltage signal corresponds to a predetermined low level of fuel in a fuel tank of the vehicle and to de-energize said light-emitting indicator 12 when said fuel level sensor voltage signal corresponds to levels of fuel above said predetermined level. The time delay circuit 22 on input 18 to the comparator is operable so as to substantially isolate the comparator 14 from the effects of rapid fluctuations in fuel level in the fuel tank of the vehicle caused by motion or orientation of the motor vehicle, and the operation of this time delay circuit will be made clear from the specific description of the two embodiments of the invention described hereinafter.

The low fuel indicator system 10 shown in FIG. 1 also includes a time delay override circuit 24 which is designed, when the system 10 is installed in a motor vehicle, to by-pass the time delay circuit 22 for a short predetermined time period when the ignition system of said motor vehicle is initially switched on, and is then rendered non-operable at the end of said short predetermined time period. The reason for the presence of this time delay override circuit 24 will be made clear during the forthcoming description of the two specific embodiments of the invention described hereinafter.

Figure 2:
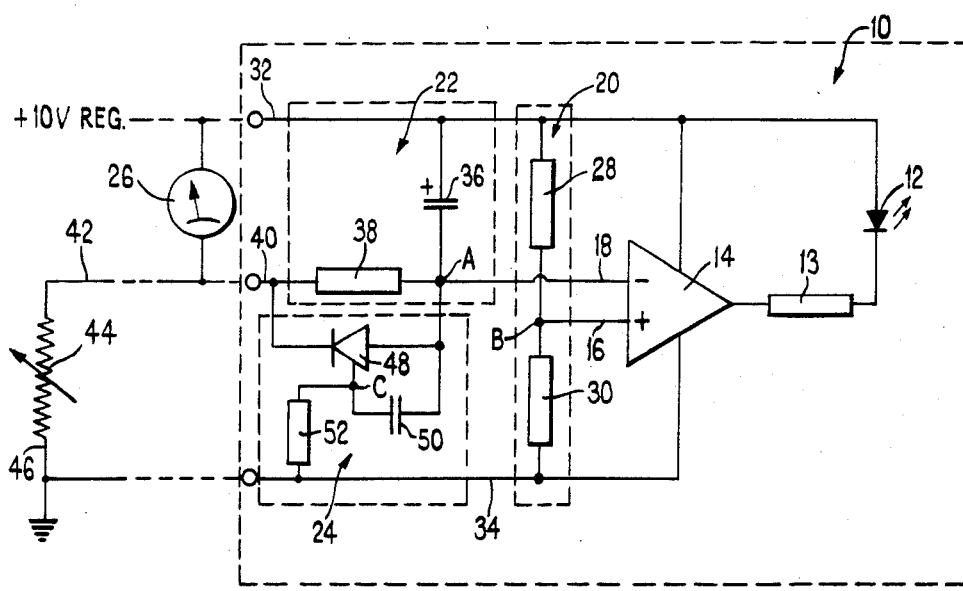
FIG. 2 shows a circuit diagram of one embodiment of the invention.

Turning now to FIG. 2 of the drawings, this shows a circuit diagram of one embodiment of the invention shown schematically in FIG. 1, and is a low fuel indicator system for use in a motor vehicle having a regulated ten volt supply to a bi-metal fuel gauge 26. In the circuit shown in FIG. 2, the light-emitting indicator 12 is a light-emitting diode, the voltage comparator 14 is an operational amplifier used in a comparator mode, and the reference voltage source 20 comprises a resistor network of two resistors 28, 30 connected in series between an input line 32 supplied with the ten volt regulated voltage and a ground line 34. The fixed reference voltage generated at junction B between resistors 28 and 30 then forms input 16 to the non-inverting input to the comparator 14. The output of comparator 14 is connected to the light-emitter diode 12 through a line resistor 13.

The time delay circuit 22 shown in FIG. 2 comprises a capacitor 36 and a resistor 38, the capacitor 36 being connected between the ten volt regulated line 32 and a junction point A connected to the input line 18 to the inverting input of the comparator 14, and the resistor 38 is connected between the junction A and an input line 40 which is connectable to one lead 42 from a variable resistance fuel level sensor 44. The other lead 46 of the variable resistance fuel level sensor 44 is connected to ground potential.

The time delay override circuit 24 of FIG. 2 comprises a thyristor 48 connected across the resistor 38 between line 40 and junction A, the thyristor 48 being triggered by a differentiating network comprising capacitor 50 and resistor 52 connected between junction A and ground potential.

The operation of the circuit of FIG. 2 will now be described, firstly without taking into account the operation of the time delay override circuit 24, and then secondly making clear the precise significance of the time delay override circuit 24.

The low fuel indicator system of FIG. 2 is shown as installed in a motor vehicle on an instrument panel of the motor vehicle adjacent the fuel gauge 26. The variable resistance fuel level sensor 44 of the motor vehicle is one in which the resistance of the fuel level sensor increases as the level of fuel in the fuel tank of the vehicle decreases. Basically the low fuel indicator system 10 of FIG. 2 operates by comparing the voltage generated at the junction point A with the fixed reference voltage generated at junction B, on the basis that the comparator 14 will complete the circuit to energize the light-emitting diode 12 when the voltage at junction A exceeds the voltage at junction B, and will break the circuit to light-emitting diode 12 when the voltage at junction A falls below the voltage at junction B. The resistance values of resistors 28 and 30 are chosen so that the fixed voltage generated at junction B is equivalent to the voltage generated at junction A when the fuel in the fuel tank of the vehicle has dropped to a predetermined low level at which refueling of the vehicle should take place.

Assume now that the motor vehicle is in motion along a road surface, and the fuel tank is approximately half full. Under these circumstances, the voltage developed at junction A will be less than the voltage developed at junction B, and the comparator 14 will keep the light-emitting diode 12 de-energized. As the vehicle continues in motion, more and more fuel is consumed, until the level of fuel in the fuel tank falls to said predetermined level where refueling of the vehicle should take place. At this point in time, the voltage developed at junction A is exactly the same as the voltage developed at junction B, and the comparator 14 is poised to energize the light-emitting diode 12. As soon as the fuel level in the tank starts to fall below said predetermined level, then the voltage at junction A rises above the voltage at junction B, and the comparator 14 energizes the light-emitting diode 12 to give visible warning to the driver of the vehicle that refueling of the vehicle should now take place. The light-emitting diode 12 will remain energized until the level of fuel in the fuel tank is raised above said predetermined level.

When a motor vehicle is in motion on a road surface, the fuel in the fuel tank is subjected to considerable agitation, and the fuel level sensor 44 is thus subjected to the condition known colloquially as "fuel slosh", where the fuel level fluctuates both rapidly and widely due to braking, acceleration or cornering of the motor vehicle. Consequently, the voltage signal generated by the fuel level sensor 44 tends to vary considerably over short periods of time, and this rapid variation in voltage signal needs to be removed before the signal enters the comparator 14. This is the function of the time delay circuit 22, the operating characteristics of which are chosen so that changes in the voltage generated at junction A occur at some time period after receiving a change in voltage signal from the fuel level sensor 44. Thus the time delay circuit 22 operates to effectively isolate junction A from the rapid changes in voltage signal from the fuel level sensor 44.

Consider now the situation when the vehicle is at rest with the ignition system switched off. Under these circumstances, the capacitor 36 of the time delay circuit 22 is discharged. Consequently, when the ignition system of the vehicle is initially switched on, the capacitor 36 effectively becomes a short-circuit and the voltage at junction point A momentarily rises to the ten volt regulated voltage. This ten volt regulated voltage is above the fixed reference voltage generated at junction B, so the comparator 14 energizes the light-emitting diode 12 to indicate to the driver of the vehicle that the low fuel indicator system is operational. Comparator 14 will not de-energize light-emitting diode 12 until the voltage generated at junction A drops below the voltage generated at junction B, and the rate at which this occurs depends upon the operating characteristics of the time delay circuit 22 and the overall fuel level of fuel in the fuel tank. If the time delay override circuit 24 were not present, the time taken for the voltage at junction A to fall below the voltage at junction B would vary from approximately five seconds for a full tank of fuel to approximately two minutes for a fuel level slightly above said predetermined level. The actual period of time in which the light-emitting diode 12 remains energized is a direct indication of the relative level of fuel in the fuel tank. Of course, it will be appreciated by a man skilled in the art that the light-emitting diode 12 will remain energized if the fuel level in the fuel tank is below said predetermined fuel level. It is evident, therefore, that the low fuel indicator system of the present invention displays the additional useful feature of giving a driver of the vehicle a separate check, other than the fuel gauge reading, of the level of fuel in the fuel tank of the motor vehicle.

In practise, however, the operating characteristics of the time delay circuit 22 are such that the light-emitting diode 12 is kept energized for a much longer period than is desirable upon initially switching on the ignition of the motor vehicle. This problem is effectively overcome in the preferred embodiment of this invention by means of the time delay override circuit 24. This time delay override circuit 24 comprises the thyristor 48, the capacitor 50 and the resistor 52, the gate electrode of the thyristor 48 being connected to junction C between capacitor 50 and resistor 52. As has already been stated before, when the ignition system of the vehicle is initially switched on, the junction point A momentarily goes to a potential of ten volts because capacitor 36 acts as a short-circuit. Similarly, capacitor 50 acts in the same way, which results in a momentary generation of a potential of ten volts at the junction C between capacitor 50 and resistor 52. This generated ten volt potential at junction C is sufficient to switch the thyristor 48 on, which, in turn, results in the thyristor 48 effectively short-circuiting resistor 38, so leading to a very rapid charging time for the capacitor 36. Consequently, the voltage generated at junction A very quickly begins to equalize to the voltage on input line 40 from the fuel level sensor 44. Thyristor 48 will continue to pass current until the current passing through it falls to about one milli-amp. Because thyristor 48 does not conduct down to zero current flow, it switches off, breaking the short-circuit path around resistor 38, before capacitor 36 is fully charged. Consequently, the last topping-up charge of capacitor 36 occurs through the time delay circuit resistor 38. If the thyristor 48 was capable of conducting down to zero current, then the light-emitting diode 12 would not be energized upon the initial switch-on of the ignition system unless the fuel level in the fuel tank was below said predetermined level. It has been found, however, that the switch-off of the thyristor 48 when the current passed falls to approximately one milli-amp results in the light-emitting diode 12 becoming energized when the fuel level in the fuel tank is at a second predetermined level corresponding approximately to the tank being a quarter full. If the level of fuel in the fuel tank is at said predetermined second level, the light-emitting diode 12 remains energized for approximately five seconds. This period of time increases sequentially as the level of fuel in the tank falls below a quarter full towards the first predetermined fuel level, and, when the fuel level reaches said first predetermined fuel level, the light-emitting diode 12 remains energized until the fuel level is increased by addition of further fuel to the fuel tank. The presence of the time delay override circuit 24 in the circuit shown in FIG. 2 gives the advantage that, on switching on the ignition circuit of the motor vehicle, the driver is made immediately aware of a potentially low fuel situation, often before the fuel gauge of the motor vehicle is correctly registering. Consequently, the driver of the vehicle has adequate warning of low fuel level in the fuel tank at the commencement of a journey, which could prove very useful if he is contemplating making a long motorway journey with the motor vehicle.

Figure 3:
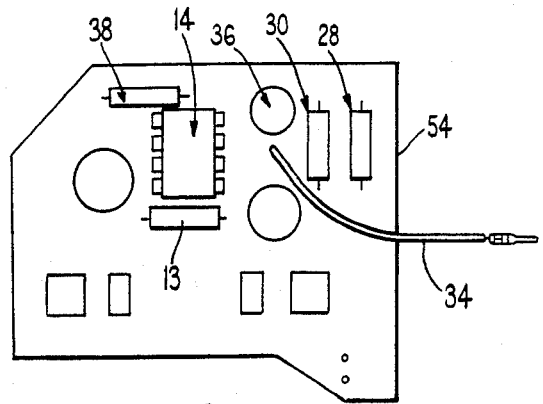
FIG. 3 shows a schematic arrangement of the circuit shown in FIG. 2, arranged upon a printed circuit board of an instrument panel.
Figure 4:
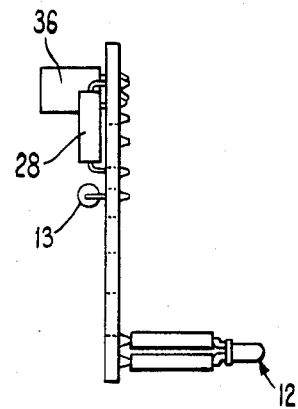
FIG. 4 shows a side view of the instrument panel board shown in FIG. 3.

The circuit components required for the circuit shown in FIG. 2 are relatively small and compact, and can quite easily be assembled upon a printed circuit board associated with the fuel gauge of an instrument panel of a motor vehicle. FIGS. 3 and 4 of the accompanying drawings show a plan and an elevational view of such a printed circuit board 54 with some of the components of the circuit shown in FIG. 2 mounted thereupon.

Figure 5:
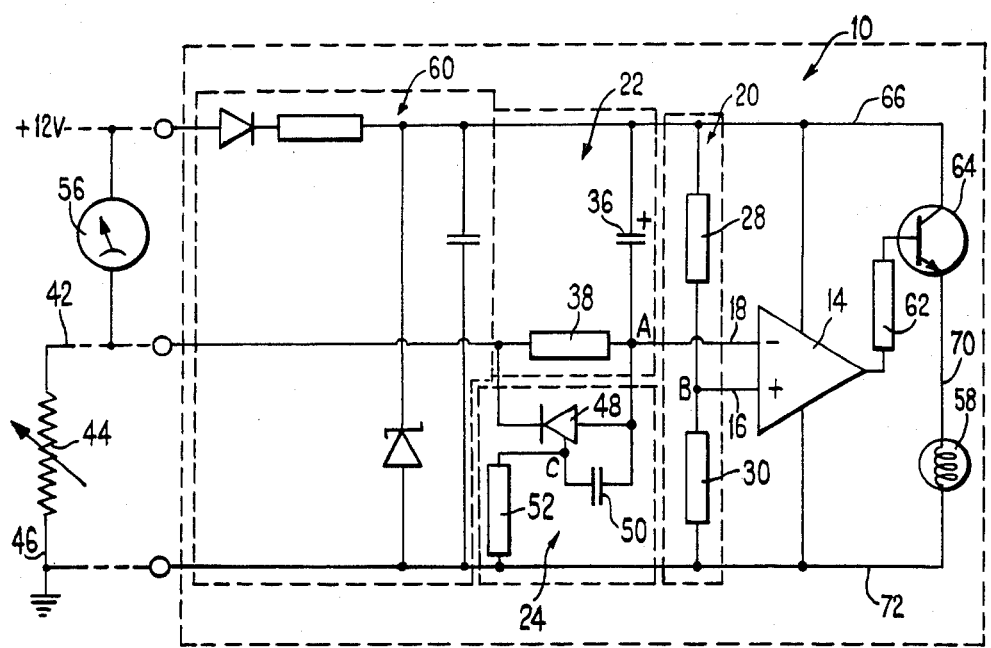
FIG. 5 shows a circuit diagram of a second embodiment of the present invention.

Turning now to FIG. 5 of the accompanying drawings, this illustrates a second embodiment of the low fuel indicator system of the present invention, designed for use with an air-core fuel gauge 56, which operates with the twelve volt battery supply of the motor vehicle. The circuit components in the circuit shown in FIG. 5 that are similar to those shown in the circuit of FIG. 2 are denoted by the same reference numerals. Essentially the low fuel indicator circuit set out in FIG. 5 is the same type as that set out in FIG. 2, except that the comparator 14 energizes or de-energizes an incandescent lamp 58, and the system as a whole is buffered against fluctuations in battery voltage by an integral buffer circuit 60.

As can be seen in FIG. 5, the output from the comparator 14 is connected via a line resistor 62 to the base of an NPN transistor 64, the emitter of which is connected to one side of the incandescent lamp 58, and the collector of which is connected to a twelve volt supply line 66 from the buffer circuit 60. In this arrangement, the comparator 14 still operates in the comparator mode, but the output from the comparator 14 is used to switch the transistor 64 on and off in order to energize or de-energize the incandescent lamp 58, instead of being used, as in the circuit shown in FIG. 2, to energize or de-energize a light-emitting diode directly.

Figure 6:
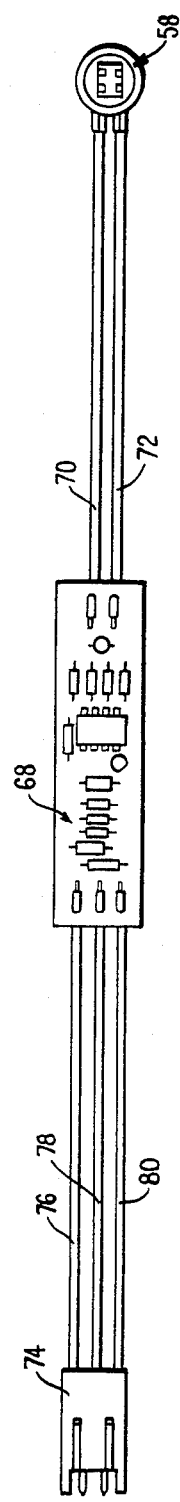
FIG. 6 shows the circuit diagram of FIG. 5 mounted upon an in-line connector.
Figure 7:
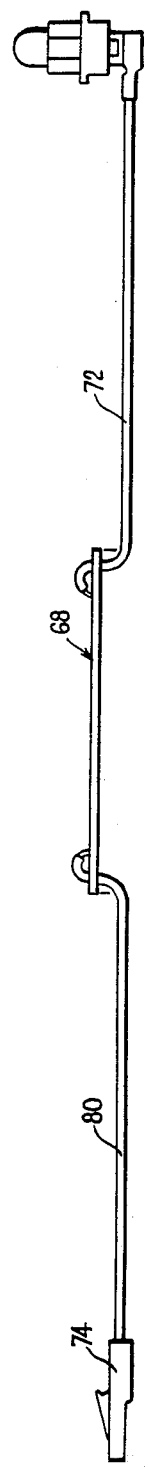
FIG. 7 shows a side view of the in-line connector of FIG. 6.

The buffer circuit 60 is a standard input buffer circuit well known in the art for use in buffering an electronic circuit against the effects of voltage changes on the power supply. Consequently, there is no need to discuss the operation of this standard input buffer circuit in any detail. All that it fundamentally does is to ensure that the operating components of the low fuel indicator system are protected against damaging transient voltages that may be present on the supply line. The circuit shown in FIG. 5 operates in exactly the same manner as the circuit shown in FIG. 2 and described hereinbefore. Because this circuit contains an integral input buffer circuit plus a transistor switching circuit, it has been designed to form part of an in-line connector which is designed to snap into position in an instrument panel wiring harness of a motor vehicle, as shown in FIGS. 6 and 7. As can be seen in FIG. 6, the circuit shown in FIG. 5 is set out on a printed circuit board 68 the incandescent lamp 58 being connected thereto by means of the respective leads 70, 72, and the low fuel indicator system being connected to a snap-in connector 74 by means of leads 76, 78 and 80.

The low fuel indicator system according to the present invention constitutes an effective visible means if warning the driver of a motor vehicle that the fuel in the fuel tank of the vehicle has fallen to an unacceptably low level, without that visible indication being affected by the motion or orientation of the vehicle whilst in motion. Moreover, the low fuel indicator system of the invention has the further advantage of providing a separate indication to the vehicle driver of a potential low fuel level situation in the vehicle when the ignition system of the vehicle is initially switched on.

The embodiments of the invention in which an exclusive property or privilege is claimed are defined as follows:

1. A low fuel indicator system for monitoring the operation of a fuel level sensor in a fuel tank in a motor vehicle having an ignition system, said indicator system having an input line supplied by the ignition system and comprising;
    voltage comparator means having an output and first and second inputs,
    a time delay circuit,
    light-emitting indicator means connected to the output, the first input being connected to a reference voltage source and the second input being connected through the time delay circuit to said fuel level sensor to receive a voltage signal from said fuel sensor, said time delay circuit substantially isolating the comparator from the effects of rapid fluctuations in fuel level in said tank, said voltage comparator means being operable to compare the voltages on said two inputs to energize said light-emitting indicator means when said fuel sensor voltage signal corresponds to a predetermined low level of fuel in said tank,
    the time delay circuit coupled to the input line and to the second comparator input and effective upon initial switching on of the ignition system to energize the indicator means for a variable time period dependent upon the relative fuel level so that higher fuel levels correspond to short indication periods and increasingly lower fuel levels result in increasingly longer indicator periods, whereby a fuel level indication is provided by the variable time period.

2. A low fuel indicator system for monitoring the operation of a fuel level sensor in a fuel tank in a motor vehicle having an ignition system, said indicator system having an input line supplied by the ignition system and comprising;
    voltage comparator means having an output and first and second inputs,
    a time delay circuit,
    light-emitting indicator means connected to the output, the first input being connected to a reference voltage source and the second input being connected through the time delay circuit to said fuel level sensor to receive a voltage signal from said fuel sensor, said time delay circuit substantially isolating the comparator from the effects of rapid fluctuations in fuel level in said tank, said voltage comparator means being operable to compare the voltages on said two inputs to energize said light-emitting indicator means when said fuel sensor voltage signal corresponds to a predetermined low level of fuel in said tank,
    the time delay circuit comprising a capacitor connected between the input line and the second input and a resistor connected between the fuel level sensor and the second comparator input so that when the ignition system is initially switched on a voltage dependent on the capacitor charging rate is applied to the second input to energize the indicator means for a variable time period dependent upon the relative fuel level so that high fuel levels correspond to short indication periods and increasingly lower fuel levels approaching the predetermined low level result in increasingly longer indicator periods, whereby a fuel level indication is provided by the variable time period.

3. A low fuel indicator system for monitoring the operation of a fuel level sensor in a fuel tank in a motor vehicle having an ignition system, said indicator system having an input line supplied by the ignition system and comprising;
    voltage comparator means having an output and first and second inputs,
    a time delay circuit,
    light-emitting indicator means connected to the output, the first input being connected to a reference voltage source and the second input being connected through the time delay circuit to said fuel level sensor to receive a voltage signal from said fuel sensor, said time delay circuit substantially isolating the comparator from the effects of rapid fluctuations in fuel level in said tank, said voltage comparator means being operable to compare the voltages on said two inputs to energize said light-emitting indicator means when said fuel sensor voltage signal corresponds to a first predetermined low level of fuel in said tank,
    the time delay circuit coupled to the input line and to the second comparator input and effective upon initial switching on of the ignition system to energize the indicator means for a variable time period,
    an override circuit coupled to the time delay circuit operable upon initial switching on of the ignition system to alter the variable time period so that the indicator means is energized when the fuel level is below a second predetermined low level higher than the first predetermined level for a period dependent upon the relative fuel level so that higher fuel levels near the second level correspond to short indication periods and increasingly lower fuel levels approaching the first level result in increasingly longer indicator periods, whereby a fuel level indication is provided by the variable time period.

4. A low fuel indicator system for monitoring the operation of a fuel level sensor in a fuel tank in a motor vehicle having an ignition system, said indicator system having an input line supplied by the ignition system and comprising;
    voltage comparator means having an output and first and second inputs,
    a time delay circuit,
    light-emitting indicator means connected to the output, the first input being connected to a reference voltage source and the second input being connected through the time delay circuit to said fuel level sensor to receive a voltage signal from said fuel sensor, said time delay circuit substantially isolating the comparator from the effects of rapid fluctuations in fuel level in said tank, said voltage comparator means being operable to compare the voltages on said two inputs to energize said light-emitting indicator means when said fuel sensor voltage signal corresponds to a first predetermined low level of fuel in said tank, the time delay circuit comprising a capacitor connected between the input line and the second input and a resistor connected between the fuel level sensor and the second comparator input so that when the ignition system is initially switched on a voltage dependent on the capacitor charging rate is applied to the second input to energize the indicator means for a variable time period, an override circuit coupled to the time delay circuit comprising a thyristor coupled across the said resistor in a direction to bypass the resistor during initial capacitor charging, the thyristor having a gate electrode coupled to the second input to initiate thyristor conduction when the ignition system is switched on to rapidly charge the capacitor until the thyristor switches off at a fixed current thereby setting the variable time period so that the indicator means is energized when the fuel level is below a second predetermined low level higher than the first predetermined level for a period dependent upon the relative fuel level so that fuel levels near the second level correspond to short indication periods and increasingly lower fuel levels approaching the first level result in increasingly longer indicator periods, whereby a fuel level indication is provided by the variable time period.

* * * * *